United States Patent [19]
Hathaway et al.

[11] Patent Number: 5,636,955
[45] Date of Patent: Jun. 10, 1997

[54] SURFACE MOUNT RING ASSEMBLY FOR LOUDSPEAKER

[76] Inventors: Dana B. Hathaway, 9 Swetts Hill, Amesbury, Mass. 01913; J. Craig Oxford, 1211 Belle Mead Blvd., Nashville, Tenn. 37205

[21] Appl. No.: 581,009

[22] Filed: Jan. 3, 1996

[51] Int. Cl.⁶ ........................ F16B 21/06
[52] U.S. Cl. ............ 411/339; 411/907; 174/65 G
[58] Field of Search ............... 411/338, 339, 411/508, 509, 510, 907, 908; 174/54, 65 G; 403/326; 285/205, 208; 24/274

[56] References Cited

U.S. PATENT DOCUMENTS

| | | | |
|---|---|---|---|
| 634,564 | 10/1899 | Sibley | 411/338 |
| 689,763 | 12/1901 | Taylor | 411/338 |
| 4,386,817 | 6/1983 | Benker et al. | 174/65 G |
| 4,878,792 | 11/1989 | Frano | 411/339 |
| 5,172,999 | 12/1992 | Ijima et al. | 411/508 |
| 5,400,461 | 3/1995 | Malish et al. | 411/508 |

FOREIGN PATENT DOCUMENTS 204377 5/1966 Sweden .................. 411/510

*Primary Examiner*—Flemming Saether
*Assistant Examiner*—Robert G. Santos
*Attorney, Agent, or Firm*—Samuels, Gauthier, Stevens & Reppert

[57] ABSTRACT

An assembly for mounting loudspeakers in a panel. A hole is formed in the panel. An outer ring having a flange is secured in the hole with the flange on one side of the panel. An inner resilient ring is collapsed, passed through the outer ring to the other side of the panel, expanded and secured to the outer ring. This locks the rings together. A loudspeaker is secured in the flange.

4 Claims, 3 Drawing Sheets

SURFACE MOUNT RING ASSEMBLY FOR LOUDSPEAKER

FIELD OF THE INVENTION

A mounting ring assembly for a loudspeaker adapted to be friction fitted into a panel such as the interior panel of a vehicle.

BACKGROUND AND BRIEF SUMMARY OF THE INVENTION

In the installation of loudspeakers in vehicles particularly in the aftermarket, holes are formed in the panels and a support structure is secured in the hole by fasteners, typically threaded fasteners. The loudspeaker is then secured to the support structure, again usually by threaded fasteners. This method of installation is time consuming and costly.

In architectural loudspeaker installations loudspeaker drives are installed into the interior and inside walls of buildings. The existing practice involves the use of a subassembly baffle to which one or more drivers are mounted. The baffle is then attached to the wall by means of assembly to a rough-in box which has been placed inside the wall. The rough-in box is a structural frame which requires an opening in the wall approximating the size of the baffle subassembly.

This invention provides a significant improvement to the installation of architectural loudspeakers by eliminating the rough-in box. A wall opening only the size needed to fit the ring is required. The elimination of the rough-in box greatly reduces installation time and labor. Additional benefits are a smaller (minimal) footprint for a cleaner look. The ring also provides for integral attachment of the grill.

The present invention comprises a surface mount ring assembly for loudspeakers, which loudspeakers are preferably characterized by a perimeter lip. The ring assembly is received and secured in a panel solely by frictional engagement. The loudspeaker is received and secured in the ring assembly solely by frictional engagement. The panel can be any flat surface, vehicular door panel, wall etc.

Broadly the invention comprises two interlocking resilient rings. An outer ring (facing the car or room interior) has a sleeve-like wall which terminates at one end with an outwardly extending flange. In a preferred embodiment, an annular groove is formed on the inner surface of the wall adjacent the flange. The outer surface of the wall is characterized by a series of ribs. The ribs are spaced in parallel relationship circumferentially along the outer surface of the wall. This enables the outer ring insert to be properly secured in panels of various thicknesses and constructions. The wall extends through and beyond the panel and forms an extension.

An inner ring (within the door) comprises a wall, having an outer surface and an inner surface; and a bearing surface at one end. The inner surface is characterized by a series of grooves. The grooves are spaced in parallel relationship circumferentially along the inner surface of the wall. The ribs of the outer ring and grooves of the inner ring are substantially mirror images of one another whereby they may be locked one to the other.

The mounting rings of the invention allow the assembly of the loudspeaker without the need for extensive reconstruction of the panel in which it is secured. No additional carpentry, plastering, papering, painting, etc. is required. For example, in installing a loudspeaker in the panel of a vehicle, a circular hole of the proper circumference is cut into the door panel forming a circular opening. The wires for the speaker can be 'fished' in the usual way, such as using a snake. The outer ring is inserted in the door panel. The inner ring is collapsed, passed through the outer ring to the inside of the door. The inner ring is released and secured onto the extension of the wall of the outer ring by the interlocking ribs and grooves. After the rings have been secured, the speaker is snapped into the groove formed in the outer ring. Optionally, a groove can be formed in the outer surface of the ring and a grill snapped into that groove.

DESCRIPTION OF THE PREFERRED EMBODIMENT(S)

Referring to FIGS. 1, 2, 3, 4 and 5, an outer surface mount ring embodying the invention is shown generally at 10 and comprises a sleeve-like wall 12 having a rear edge 14 and a front edge 16. The front edge is characterized by an outwardly extending flange 18.

Figure 1:
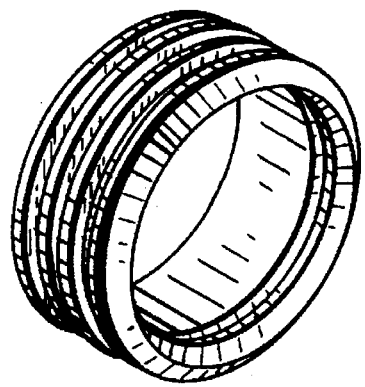
FIG. 1 is a perspective view of an outer surface mount ring of the invention.
Figure 2:
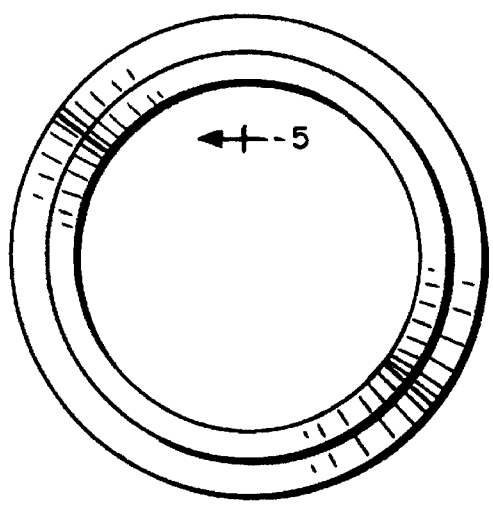
FIG. 2 is a top view of the ring of FIG. 1.
Figure 3:
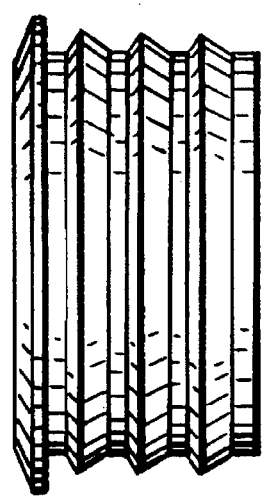
FIG. 3 is a side view of the ring of FIG. 1.
Figure 4:
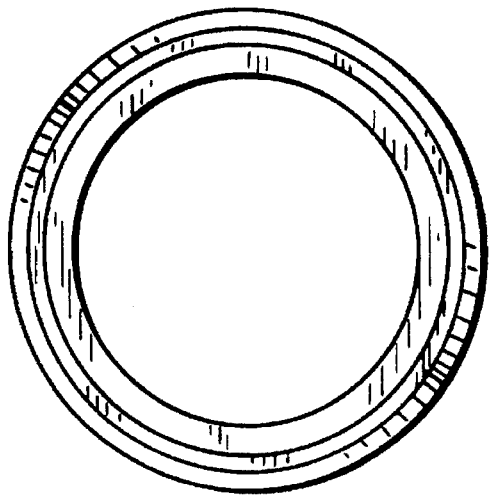
FIG. 4 is a bottom view of the ring of FIG. 1.
Figure 5:
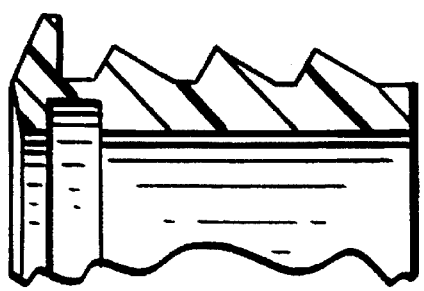
FIG. 5 is a sectional view of FIG. 2 taken along lines 5—5.

Referring to FIG. 5, formed on the inner surface of the sleeve-like wall 12 is an annular groove 20.

There are three ribs 22, 24 and 26 formed on the outer surface of the wall 12. The rings are uniformly arrayed in side-by-side parallel relationship.

A preferred configuration of the rings is shown and they comprise a ramp-like structure with a long ramp 28 intersecting a rear wall 30 at about a 70° angle.

Figure 6:
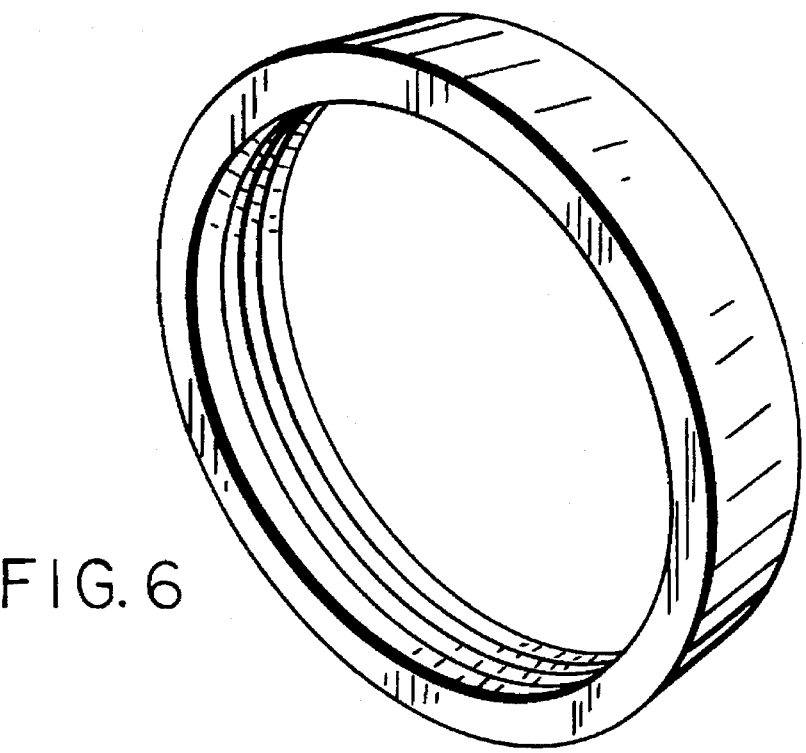
FIG. 6 is a perspective view of an inner surface mount ring of the invention.

Referring to FIG. 6, an inner ring assembly is shown generally at 40 and comprises an outer wall 42 and an inner wall 44 characterized by grooves 46, 48 and 50. The grooves are circumferentially arrayed in parallel spaced apart relationship on the inner wall. Further, the grooves 46, 48 and 50 are configured to be substantially the mirror image dimensionally of the ribs 22, 24 and 26 of the outer mount ring 10. Also, the ring 40 comprises a bearing surface 52.

Figure 7:
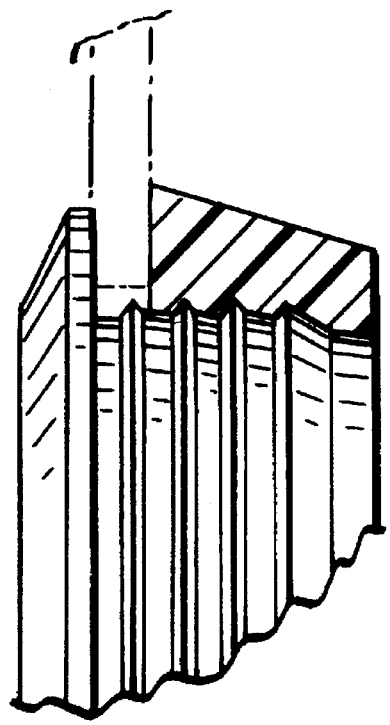
FIG. 7 is a sectional view of a speaker secured to a panel by the surface mount ring assembly of the invention.

Referring to FIG. 7, a panel is shown generally as 60 and may comprise the panel of a vehicle, wall board, or other flat surface. To secure a loudspeaker (woofer basket) to the panel 60, the outer ring 10 is first inserted into a hole 62 formed in the panel 60. At this time, the outer ring 10 is held in the panel 60 by frictional engagement of the rib 22 with the panel.

The inner ring 40 is collapsed and passes through the center of the outer ring and once on the other side of the panel it is allowed to expand. Pressure is applied to the inner and outer rings along an axis substantially perpendicular to their walls to snap the mating ribs/grooves 24–50 and 26–48 together in interlocking relationship.

As shown in FIG. 7, this arrangement provides for two bearing surfaces, one at the interface of the underside of the flange 18 of the outer ring 10 and panel and the other at the interface of the bearing surface 52 of the inner ring and the panel. There are two additional locations for securing the assembly to the panel; one between the interlocking ribs and grooves and the other between the rib(s) and the panel.

The configuration and spacing of the rings and ribs ensure that there will be a secure fit regardless of either the thickness of the panel or the materials of its sandwich construction. A prior art loudspeaker is shown in dotted lines and is adapted to be secured in the groove 20 of the insert 10.

Figure 8:
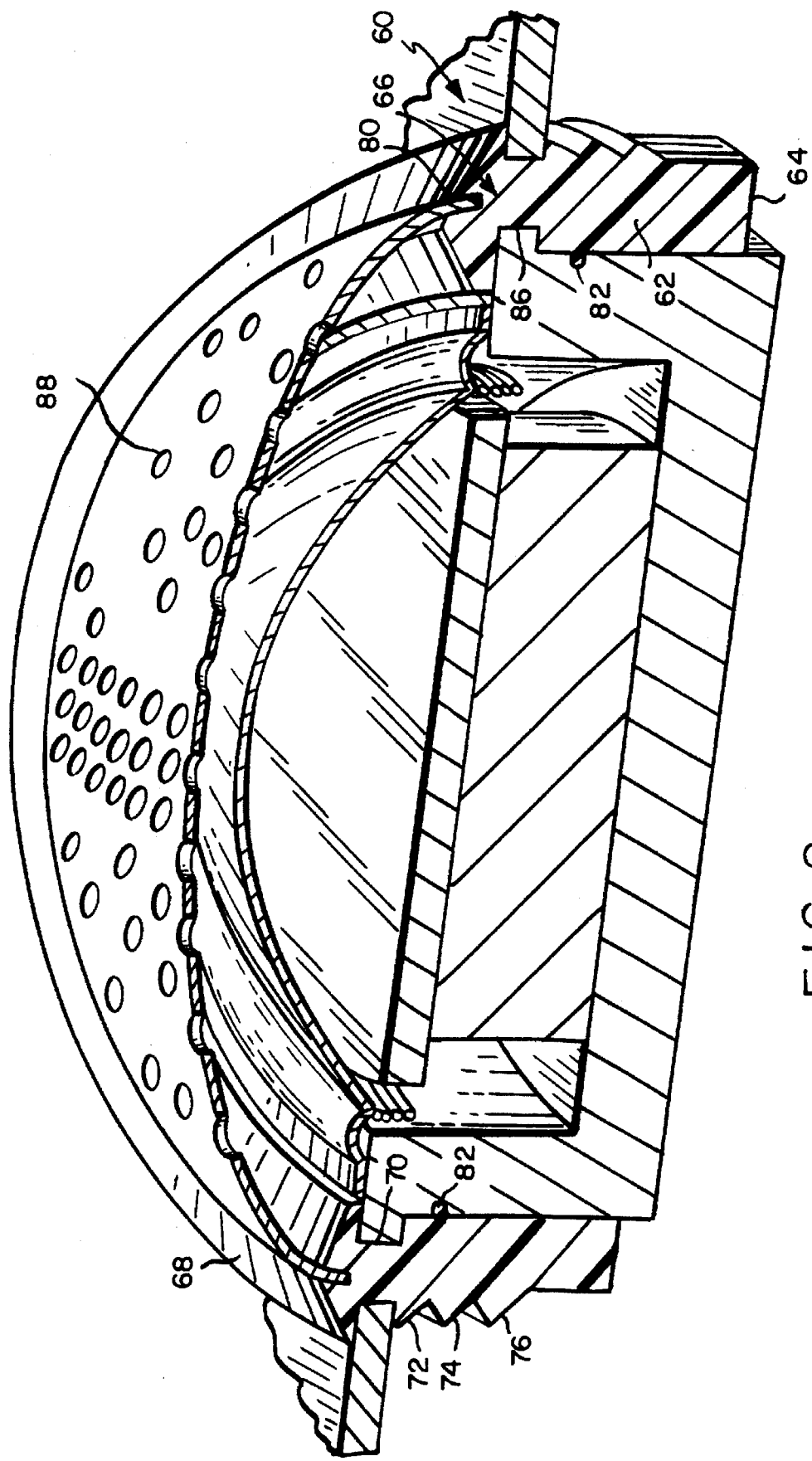
FIG. 8 is a perspective sectional view of an outer ring assembly illustrating a woofer basket and grill secured thereto.

Referring to FIG. 8, an alternative embodiment of an outer ring assembly is shown generally at 60. The outer ring assembly 60 is secured to a panel. The assembly 60 comprises a sleeve-like wall 62 having a rear edge 64 and a front edge 66. The front edge is characterized by an outwardly extending flange 68 and an annular groove 70. In this embodiment, the panel is secured between the upper most rib 72 and the outwardly extending flange 68. The front edge 66 is further characterized by an annular groove 80 formed in the top surface as shown. The inner surface of the wall 62 is characterized by an inwardly extending ring 82. The outer ring 60 is configured to be engaged with an inner ring, such as shown in FIGS. 6 and 7, but not shown in FIG. 8.

A woofer basket typically having an outwardly extending lip 86 is secured in the annular groove 70. The woofer basket is further secured to the outer ring by frictional engagement between the outer surface of the woofer basket and the inner surface of the sleeve-like wall 62. This frictional engagement is further enhanced by the ring 82 acting on the wall of the woofer basket. Lastly, a grill 88 is fitted to the groove 80. The perimeter of the grill 88, in combination with the groove 80, are configured such that when the grill 88 is inserted in the groove 80 a force is created on the inner portion of the flange which causes the inner portion of the flange to be biased inwardly and downwardly onto the upper surface of the woofer basket as shown.

Although described with reference to three uniformly arrayed ribs, the rings may be non-uniformly arrayed and/or randomly arrayed over the outside wall of the sleeve. Also, depending upon the specific dimension of the panel the number of ribs of both rings can vary.

The rings may comprise the same or different polymeric or elastomeric materials. Preferably the rings are formed of an elastomeric material having a durometer of between 30 to 90, preferably between 40 to 50. The selection of the materials results in the ability of the rings to reduce transmission of vibrations from the loudspeaker to the panel by providing isolation and damping. Similarly, the loudspeaker is isolated from the vibrations inherent in the structure in which it is secured, whether a door panel or wall panel. If desired, the outer ring may be stiffer than the inner ring.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described our invention what we now claim is:

1. A surface mount ring assembly which comprises:
   an outer ring having a sleeve-like wall having an inner and an outer surface, a front edge and a rear edge, the front edge characterized by a flange extending outwardly therefrom, a groove formed on the inner surface adjacent the front edge adapted to receive a flange of a loudspeaker, the outer surface of the sleeve-like wall characterized by a plurality of ribs arrayed in parallel relationship spaced from the front edge to the rear edge of the outer wall; and
   an inner resilient ring characterized in that said inner resilient ring is adapted to be collapsed and passed through the inner sleeve of the outer ring and then allowed to expand, the inner resilient ring assembly having a sleeve-like wall, the inner surface of the wall characterized by a plurality of grooves which are substantially the mirror image of the ribs of the outer ring, the ribs and grooves adapted to be secured to one another in interlocking relationship in a panel whereby a loudspeaker can be secured to the ring assembly and thereby in the panel.

2. The assembly of claim 1 wherein the flange of the outer ring has an upper surface and a groove is formed in the upper surface whereby a cage can be secured in said groove while biasing the flange downwardly and inwardly.

3. The assembly of claim 1 wherein the inner surface of the sleeve-like wall of the outer ring is characterized by a rib-like projection thereon, which projection is adapted to engage the wall of a loudspeaker received within the sleeve-like wall.

4. The surface mount ring assembly of claim 1 wherein the outer ring is a resilient outer ring.

* * * * *